United States Patent
Dry

(10) Patent No.: US 10,391,912 B2
(45) Date of Patent: Aug. 27, 2019

(54) LAY IN PLACE CAPILLARY CONTROL SYSTEM FOR AIR SUSPENDED SEATING

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 15/254,244

(22) Filed: Sep. 1, 2016

(65) Prior Publication Data
US 2018/0056827 A1    Mar. 1, 2018

(51) Int. Cl.
B60N 2/90    (2018.01)
F16K 15/14    (2006.01)
F16K 15/20    (2006.01)

(52) U.S. Cl.
CPC ............ B60N 2/914 (2018.02); F16K 15/144 (2013.01); F16K 15/145 (2013.01); F16K 15/20 (2013.01)

(58) Field of Classification Search
CPC ....... B60N 2/914; F16K 15/20; F16K 15/144; F16K 15/145
USPC ............................................ 297/452.1, 284.6
See application file for complete search history.

(56) References Cited

U.S. PATENT DOCUMENTS

| | | | |
|---|---|---|---|
| 2,434,641 A * | 1/1948 | Burns | A47C 27/081 114/219 |
| 3,330,598 A | 7/1967 | Whiteside | |
| 3,363,941 A | 1/1968 | Wierwille | |
| 3,730,588 A | 5/1973 | Braun | |
| 3,792,501 A | 2/1974 | Kery | |
| 4,017,118 A | 4/1977 | Cawley | |
| 4,018,477 A | 4/1977 | Hogan | |
| 4,145,083 A | 3/1979 | Urban | |
| 4,316,631 A | 2/1982 | Lenz et al. | |
| 4,536,030 A | 8/1985 | Sakurada et al. | |
| 4,592,588 A | 6/1986 | Isono et al. | |
| 4,615,563 A | 10/1986 | Kobayashi | |
| 4,629,248 A | 12/1986 | Mawbey | |
| 4,634,179 A | 1/1987 | Hashimoto et al. | |
| 4,722,550 A | 2/1988 | Imaoka et al. | |
| 4,761,011 A | 8/1988 | Sereboff | |
| 4,792,186 A | 12/1988 | Benjamin et al. | |
| 4,840,425 A | 6/1989 | Noble | |
| 4,909,568 A | 3/1990 | Dal Monte | |
| 4,965,899 A | 10/1990 | Sekido et al. | |
| 5,082,326 A | 1/1992 | Sekido et al. | |
| 5,135,282 A | 8/1992 | Pappers | |
| 5,433,506 A | 7/1995 | Jensen | |

(Continued)

FOREIGN PATENT DOCUMENTS

| | | |
|---|---|---|
| DE | 10158876 A1 | 6/2003 |
| DE | 102004017212 B3 | 6/2005 |

Primary Examiner — Craig M Schneider
Assistant Examiner — Angelisa L. Hicks
(74) Attorney, Agent, or Firm — Vichit Chea; Price Heneveld LLP

(57) ABSTRACT

A bladder unit includes upper and lower sheets defining opposed portions of a first bladder. The bladder unit further includes a first extruded element having upper and lower faces respectively coupled with the upper sheet and the lower sheet at a portion of a first boundary of the first bladder. A first capillary extends through the element and across the portion of the first boundary.

19 Claims, 11 Drawing Sheets

(56) References Cited

U.S. PATENT DOCUMENTS

| | | |
|---|---|---|
| 5,529,377 A | 6/1996 | Miller |
| 5,584,085 A | 12/1996 | Banko |
| 5,662,384 A | 9/1997 | O'Neill et al. |
| 5,806,928 A | 9/1998 | Gattuso et al. |
| 5,860,705 A | 1/1999 | Ridder |
| 5,879,053 A | 3/1999 | Lux et al. |
| 5,927,807 A * | 7/1999 | Heller .................. A47C 4/54 297/284.3 |
| 6,036,265 A | 3/2000 | Cosentino |
| 6,203,105 B1 | 3/2001 | Rhodes, Jr. |
| 6,206,474 B1 | 3/2001 | Kruse et al. |
| 6,234,578 B1 | 5/2001 | Barton et al. |
| 6,353,207 B1 | 3/2002 | Burt |
| 6,386,633 B1 | 5/2002 | Newton |
| 6,450,579 B1 | 9/2002 | Nylander et al. |
| 6,554,360 B1 | 4/2003 | Wilke et al. |
| 6,568,754 B1 | 5/2003 | Norton et al. |
| 6,623,076 B2 | 9/2003 | Klingler |
| 6,823,549 B1 | 11/2004 | Hampton et al. |
| 6,865,825 B2 | 3/2005 | Bailey, Sr. et al. |
| 6,905,170 B2 | 6/2005 | McMillen et al. |
| 6,912,748 B2 | 7/2005 | VanSickle |
| 7,059,678 B1 | 6/2006 | Taylor |
| 7,086,700 B2 | 8/2006 | Habedank |
| 7,108,323 B2 | 9/2006 | Welch et al. |
| 7,225,486 B2 | 6/2007 | Jackson, III |
| 7,255,399 B2 | 8/2007 | White et al. |
| 7,311,358 B2 | 12/2007 | White et al. |
| 7,364,229 B2 | 4/2008 | Lee |
| 7,490,900 B2 | 2/2009 | Szczudrawa |
| 7,874,618 B2 | 1/2011 | Kohl et al. |
| 8,181,292 B1 * | 5/2012 | Pellettiere .......... B60N 2/42709 5/654 |
| 8,261,387 B2 * | 9/2012 | Lipman ................ A47C 27/084 5/655.9 |
| 8,275,514 B2 | 9/2012 | Hwang et al. |
| 8,460,502 B2 * | 6/2013 | Bergmann ............. B29C 70/44 156/283 |
| 8,510,884 B2 | 8/2013 | Lee |
| 8,827,371 B2 | 9/2014 | Brncick et al. |
| 8,944,504 B2 | 2/2015 | Zimmerman, II |
| 9,211,824 B2 | 12/2015 | Arant et al. |
| 2006/0061183 A1 | 3/2006 | White et al. |
| 2008/0122274 A1 | 5/2008 | Edwards |
| 2010/0207443 A1 | 8/2010 | Brncick |
| 2011/0266855 A1 | 11/2011 | Zimmerman, II |
| 2013/0062920 A1 | 3/2013 | McDiarmid |
| 2013/0285426 A1 | 10/2013 | Arant et al. |
| 2015/0008710 A1 | 1/2015 | Young et al. |
| 2015/0126926 A1 | 5/2015 | Giambattista et al. |
| 2015/0143636 A1 * | 5/2015 | Wilkinson .......... A47C 27/082 5/655.3 |
| 2015/0230803 A1 * | 8/2015 | Schreckengaust ... A61B 17/135 606/202 |

* cited by examiner

LAY IN PLACE CAPILLARY CONTROL SYSTEM FOR AIR SUSPENDED SEATING

FIELD OF THE INVENTION

The present invention generally relates to an air control network for an inflatable vehicle seat. More particularly, the air control network uses a plurality of extruded elements with capillaries therein in a dual sheet bladder assembly.

BACKGROUND OF THE INVENTION

Various types of air-filled supports for vehicle seating surfaces have been developed. Depending on the particular configuration and in the intended pressurization scheme to be employed, varying routing and control networks for the air-to be distributed among the various bladders can differ. In various examples, such routing may be achieved by forming capillaries or other air supply lines into the bladder network along with bladder formation, which may be carried out using, for example, a dual hot plate vacuum forming process. Such a process, however, is largely inflexible, requiring separate molds for each routing pattern, even among a common bladder network. Alternatively, various individual capillaries can be positioned between sheets during bladder unit formation. This process can be time-consuming and expensive and can result in high failure rates due to the delicate nature of the capillaries and the accuracy with which they must be placed to achieve a proper seal of the associated cells.

SUMMARY OF THE INVENTION

According to one aspect of the present disclosure, a bladder unit includes upper and lower sheets defining opposed portions of a first bladder. The bladder unit further includes a first extruded element having upper and lower faces respectively coupled with the upper sheet and the lower sheet at a portion of a first boundary of the first bladder. A first capillary extends through the element and across the portion of the first boundary.

According to another aspect of the present disclosure, a method for assembling a bladder unit includes positioning a first extruded body over at least a portion of a first designated boundary of a bladder at least partially defined in a first sheet and positioning a second sheet over the first sheet. The method further includes coupling the first extruded body with the first sheet and the second sheet along the first designated boundary with a capillary of the first extruded body in fluid communication with the bladder.

According to another aspect of the present disclosure, a capillary system includes a first extrusion defining opposite upper and lower bonding surfaces, a first capillary between the upper and lower surfaces, and an opening on a side of the extrusion to the capillary. The system further includes a second extrusion defining opposite upper and lower bonding surfaces and a second capillary between the upper and lower surfaces and fluidically coupled with the first capillary at the opening. A check valve is included between the first and second capillaries.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
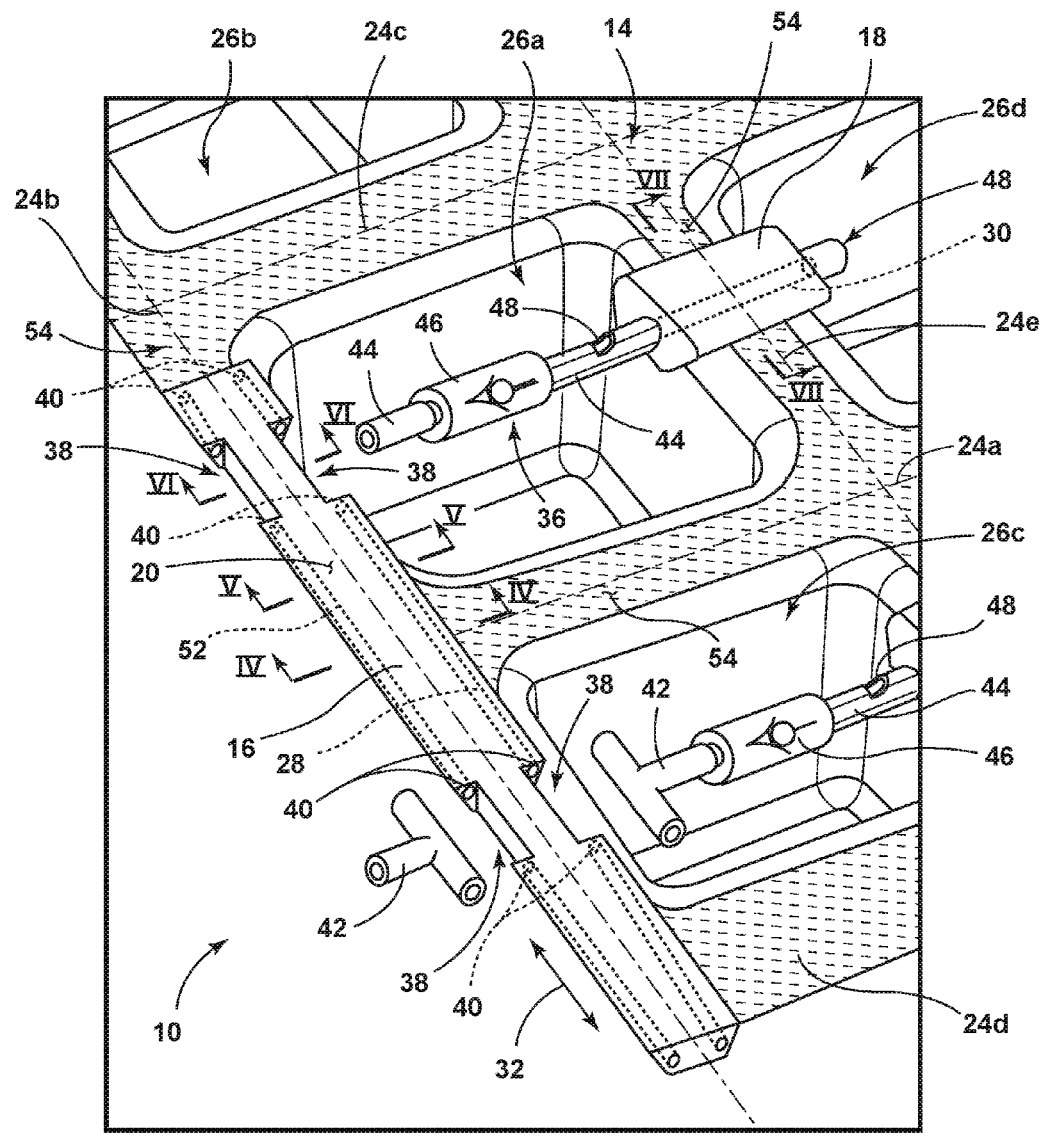
FIG. 1 is a perspective assembly view of a bladder unit according to an aspect of the disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a bladder unit. Bladder unit 10 includes an upper sheet 12 and a lower sheet 14 defining opposed portions of a first bladder 26. Bladder unit 10 further includes a first extruded element 16,18 having an upper face 20 and a lower face 22 respectively coupled with the upper sheet 12 and the lower sheet 14 along at least a portion of a first boundary 24 of the first bladder 26. A first capillary 28,30 extends through the extruded element 16, 18 and across the portion of the first boundary 24.

As shown in the perspective view of FIG. 1, bladder unit 10 can include a number of extruded elements 16, 18 extending in various directions and across various boundaries 24 between adjacent bladders 26 of bladder unit 10. Such an arrangement can be used to transfer air, or another fluid usable within bladder unit 10, among the various bladders 26 (which are illustrated as bladders 26a-26d and are referred to specifically in this manner, while being referred to collectively or generically as bladders 26 or bladder 26 with other features being referred to in a similar manner) according to a desired scheme for such movement or transfer. In the example of FIG. 1, a main extruded element 16 can extend along a length 32 thereof, such length being normal to first boundary 24a of a first bladder 26a, such that the first capillary 28 thereof extends across boundary 24a. Further, extruded element 16 can be configured such that the length 32 thereof extends along another boundary 24b surrounding an additional portion of bladder 26a that is generally normal to first boundary 24a. In this manner, extruded element 16 can align at least a first capillary 28 so as to extend across a number of additional boundaries at least partially defined within lower sheet 14, including boundary 24c, which is positioned between adjacent bladders 26a and 26b, as well as across boundary 24a, which is, itself, positioned between (and shared by) bladder 26a and bladder 26c. Still further, main extruded element 16 can also extend across boundary 24d, which is oppositely positioned from the boundary 24a with respect to bladder 26c and to an exterior of bladder unit 10. As shown, this arrangement can be achieved in bladder unit 10 due to the positioning of boundary 24b so as to be common among adjacent bladders 26a, 26b, and 26c.

As further shown in FIG. 1, additional extruded elements 18 can be used to further move air in a direction normal to the length 32 of the main extruded element 16 so as to, for example, transfer air from adjacent bladders, including bladder 26d that are disposed across an additional boundary 24e opposite bladder 26a, for example, from boundary 24b. As illustrated, such an extruded element 18 can be positioned so as to cross boundary 24e in a location that is disposed between boundaries 24a and 24c, as opposed to main extruded element 16 which extends along a boundary 24b. Different combinations of such elements in such positions can be used to transfer air as needed among various ones of bladders 26 and to accommodate additional features for facilitating the desired transfer of air, as discussed below.

As further shown in FIG. 1, various forms of a coupling assembly 36 may be used to facilitate the transfer of air or other fluidic communication between main extruded element 16 and any additional extruded elements 18 within bladder unit 10. As illustrated, main extruded element 16 may include one or more notches 38 therein that are cut or otherwise formed in a side thereof to expose open ends 40 of the associated capillary 28 along an intermediate portion or portions of extruded element 16. Respective T-couplings 42 may be positioned within notch 38 and may be coupled with the adjacent facing exposed ends 40 of the associated capillary 28 and may further couple with a tube 44 that extends away from extruded element 16 to couple with capillary 30 of extruded element 18. Tube 44 may include therein, or otherwise have coupled therewith, a check valve 46 to control the direction of movement of air between main extruded element 16 and bladder 26a, for example. In the example illustrated in FIG. 1, check valve 46 is included and oriented so as to prevent air from flowing out of bladder 26a and back into extruded element 16, however other arrangements are possible. In the illustrated example, tube 44 can further include an outlet 48 that allows the flow of air from main extruded element 16 and through check valve 46 to enter bladder 26a. Further, outlet 48 allows for fluidic communication between bladder 26a and bladder 26d through capillary 30 of extruded element 18. In another arrangement, T-coupling 42 can couple with a check valve 46 that is open via an outlet thereof to bladder 26a without a portion of tube 44 coupling with capillary 30. In this arrangement, capillary 30 may still provide for fluidic communication between bladder 26a and bladder 26d. However, in some assemblies it may be desirable to include tube 44 to fixedly arrange extruded elements 18 and 16 together prior to assembly with lower sheet 14, as described below.

Figure 2:
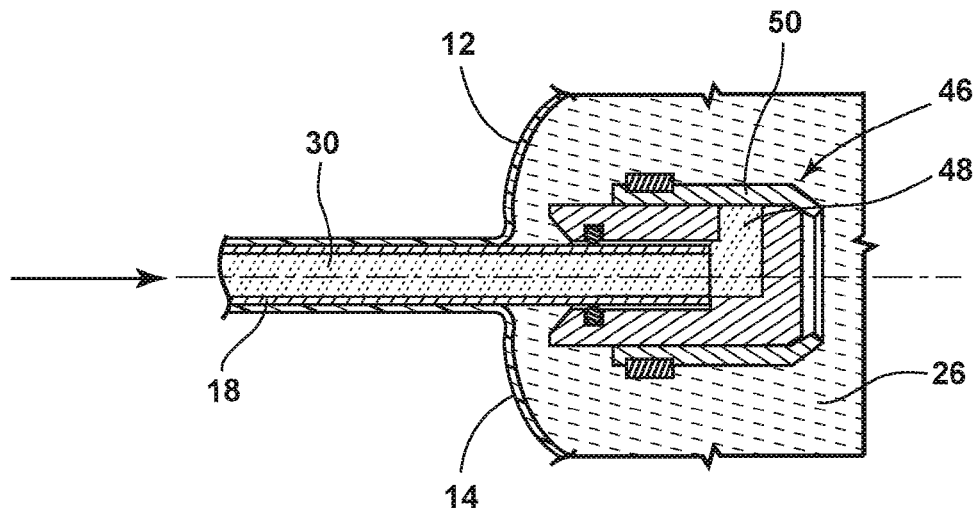
FIG. 2 is a side cross-section view of a valve that can be used in the bladder unit of FIG. 1.
Figure 3:
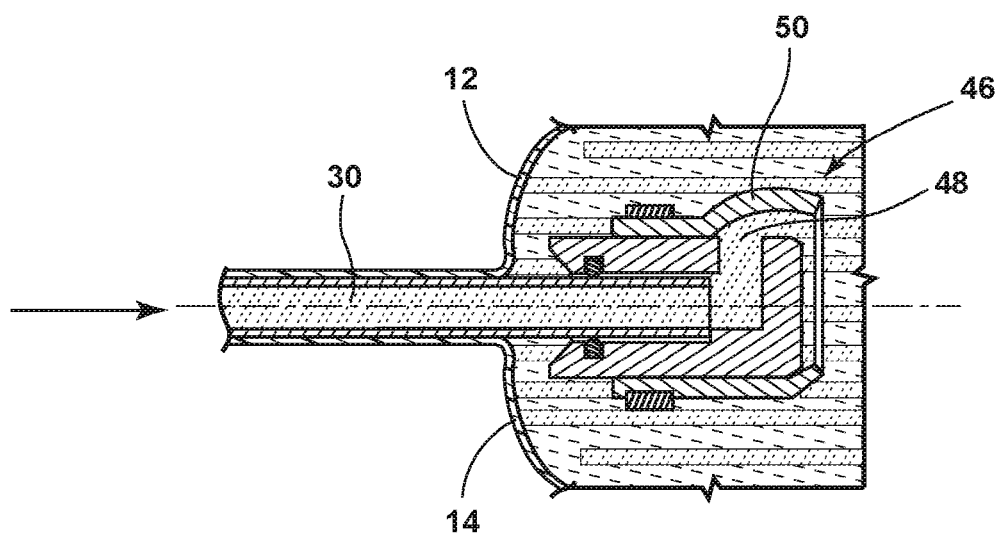
FIG. 3 is a side cross-section view of the valve of FIG. 2 in an open condition.
Figure 4:
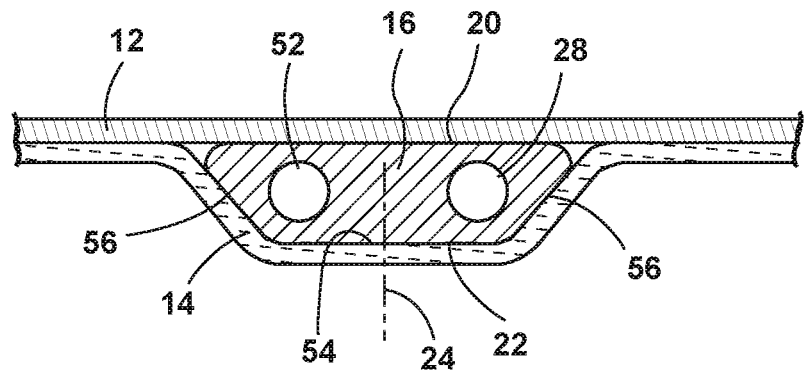
FIG. 4 is a cross-section detail view of the portion of the bladder unit indicated by section line IV-IV in FIG. 1.

As shown in FIGS. 2 and 3, a variation of check valve 46 can include a cuff 50 surrounding an outlet 48 positioned beneath a portion of cuff 50 and in communication with one of T-coupling 42 or tube 44. As shown in FIG. 3, when a pressure downstream of cuff 50 (i.e. within capillary 28) is greater than a pressure within bladder 26, such pressure can cause outward deformation of cuff 50 thereby allowing air to flow into bladder 26. Conversely, as shown in FIG. 2, when the pressure within bladder 26 is greater than within, for example, tube 44, the pressure within bladder 26 can cause cuff 50 to be pressed onto outlet 48 thereby preventing flow of air from out of bladder 26 and into tube 44. Such an arrangement, which may be referred to as a "cuff valve" can be used in the above-described example, wherein the portion of tube 44 between check valve 46 and capillary 30 is omitted.

Returning to FIG. 1 it can be seen that main extruded element 16 can include a second capillary 52 that extends parallel with first capillary 28 in a manner generally parallel therewith. This arrangement can be used to provide for a second line of air through extruded element 16 to portions of bladder unit 10 separate from or remote from the depicted bladders 26a, 26b, 26c, and 26d. In the illustrated example, a further plurality of notches 38 are present along extruded element 16 on a side thereof opposite the above-described notches 38 that can, in a similar manner, expose open ends 40 of second capillary 52 for connection with similar coupling assemblies to those coupling assemblies 36 described above, including by use of a T-coupling 42, as illustrated that can extend in a direction opposite the T-coupling 42 associated with bladder 26c. In this manner, bladder unit 10 can define a further arrangement of bladders 26 on the side of second capillary 52 to provide a flow of air to additional bladders positioned on that side of extruded element 16.

As illustrated, the above-described boundaries 24 surrounding and separating adjacent ones of bladders 26 can be defined along lands 54 that are spaced above the portions of bladders 26 defined within lower sheet 14. As illustrated, lands 54 can be generally flat sections of the sheet material used to define lower sheet 14. In this manner, as illustrated in FIGS. 4-7, the included portions of extruded element 16 and 18 within bladder unit 10 can be bonded between upper sheet 12 and lower sheet 14 along or across the respective portions of boundaries 24 by being coupled with lower sheet 14 along corresponding portions of lands 54. In the illustrated examples, upper sheet 12 is depicted as a flat sheet such that the corresponding portions of boundary 24 associated therewith are defined by portions of upper sheet 12 that bond with either lands 54 or with extruded element 16 and 18 in areas thereof that overlie lands 54. As illustrated, the bonding of upper sheet 12 and lower sheet 14, in particular, with the respective extruded elements 16 and 18 can vary depending on the location and orientation of extruded elements 16 and 18 with respect to cells 26 boundaries 24 and lands 54. In one example, in the depiction of FIG. 4, corresponding to the cross-sectional location depicted along line IV-IV in FIG. 1, corresponding to an intersection of boundary 24a with boundary 24b, in which extruded element 18 extends along boundary 24b, extruded element 16 may interrupt the direct bonding between upper sheet 12 and lower sheet 14 that extends along the direction of boundary 24a. In this manner, the lower face 22 of extruded element 16 may bond with lower sheet 14, and lower sheet 14 may wrap around adjacent portions of extruded element 16 such that lower sheet 14 further bonds with the depicted angled side faces 56 of extruded element 16 before rejoining with upper sheet 12 along the remaining portions of land 54. It is noted that the depicted trapezoidal arrangement of extruded element 16, wherein lower face 22 is generally narrower than upper face 20 such that side faces 56 of extruded element 16 are positioned at an angle of approximately 45 degrees (+/−10 degrees) facilitate this type of bonding with lower sheet 14.

Figure 5:
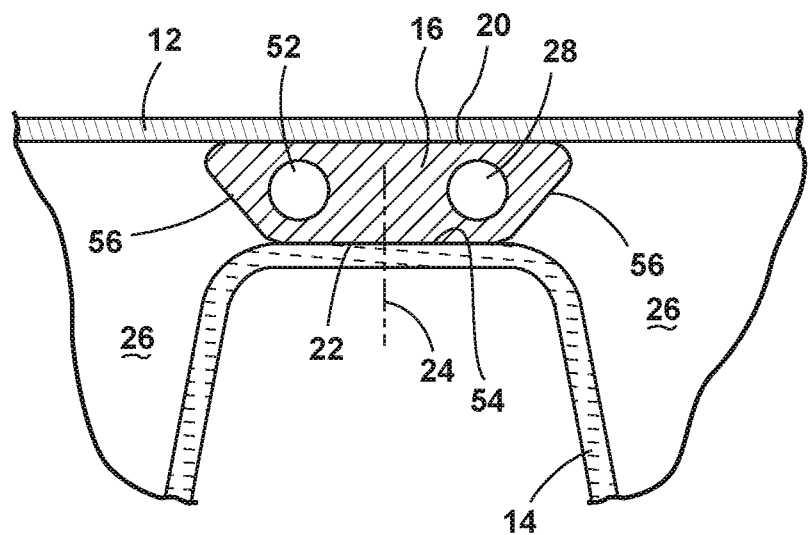
FIG. 5 is a cross-section detail view of the portion of the bladder unit indicated by section line V-V in FIG. 1.
Figure 6:
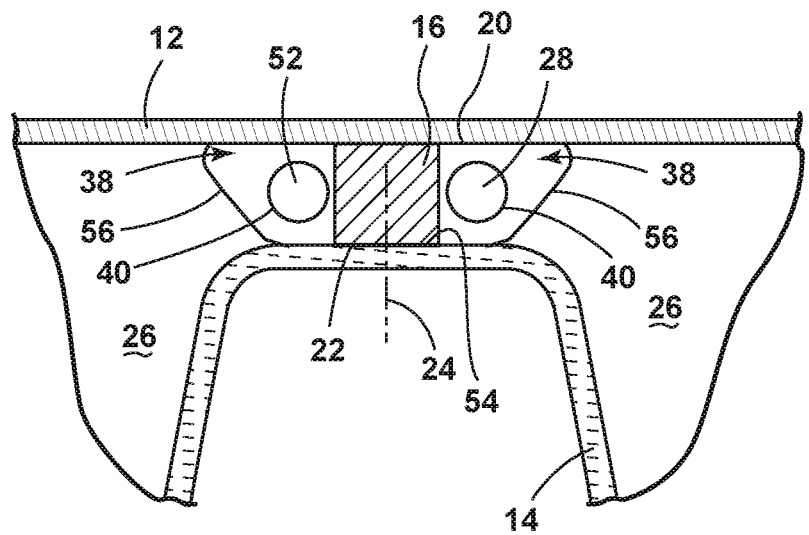
FIG. 6 is a cross-section detail view of the portion of the bladder unit indicated by section line VI-VI in FIG. 1.
Figure 7:
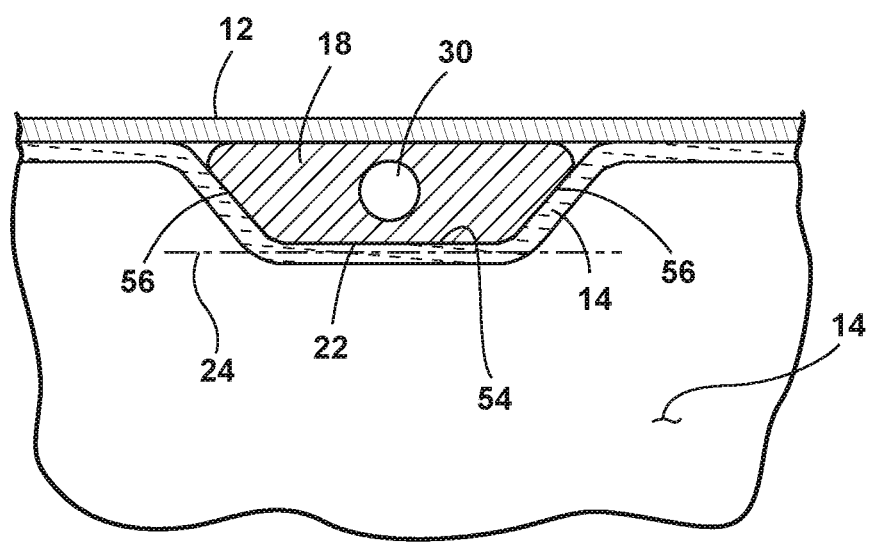
FIG. 7 is a cross-section detail view of the portion of the bladder unit indicated by section line VII-VII in FIG. 1.

As shown in FIG. 5, in the cross-sectional area of section V-V depicted in FIG. 1, when extruded element 16 is positioned along boundary 24b in an area adjacent bladder 26a, extruded element 16 may be bonded with lower sheet 14 along the respective land 54 along boundary 24b, with upper sheet 12 being bonded along upper face 20 of extruded element 16. In this arrangement, these side faces 56 of extruded element 16 may further define adjacent portions of bladder 26a with the associated bonding between upper face 20 and upper sheet 12 and lower face 22 and lower sheet 14 helping to seal the bladder 26a in the area surrounding extruded element 16. As can be seen in FIG. 6 in the cross-sectional area of section VI-VI in FIG. 1, wherein notches 38 are present to allow fluidic communication between capillaries 28 and 52 with respective adjacent bladders 26 respective portions of upper face 20 and lower face 22 can still be present to bond with upper sheet 12 and lower sheet 14 to maintain the above-mentioned seal surrounding bladder 26. Still further, in the location of section VII-VII of FIG. 1, extruded element 18, when crossing boundary 24e along land 54, can be bonded with upper sheet 12 and lower sheet 14 in a manner similar to extruded element 16 shown in FIG. 4. In this manner, extruded element 18 is similarly formed in a trapezoidal cross-section with upper face 20 being generally wider than lower face 22 such that lower sheet 14 can bond with upper sheet 12 in the areas outside of extruded element 18. Further, lower sheet 14 can extend along side-faces 56 and away from upper sheet 12 to further extend along and bond with lower face 22 of extruded element 18. The above-described arrangements allow for the various extruded elements 16,18 included in bladder unit 10 to be used in place of formed-in capillaries or other passages within upper sheet 12 and lower sheet 14 for individual placed capillary lines with a more robust and reliable structure that is, further, more flexible than formed-in connections between bladders 26. Such an arrangement can allow for easier assembly of varied routing schemes within and along bladders 26 in individual bladder units 10.

Figure 8:
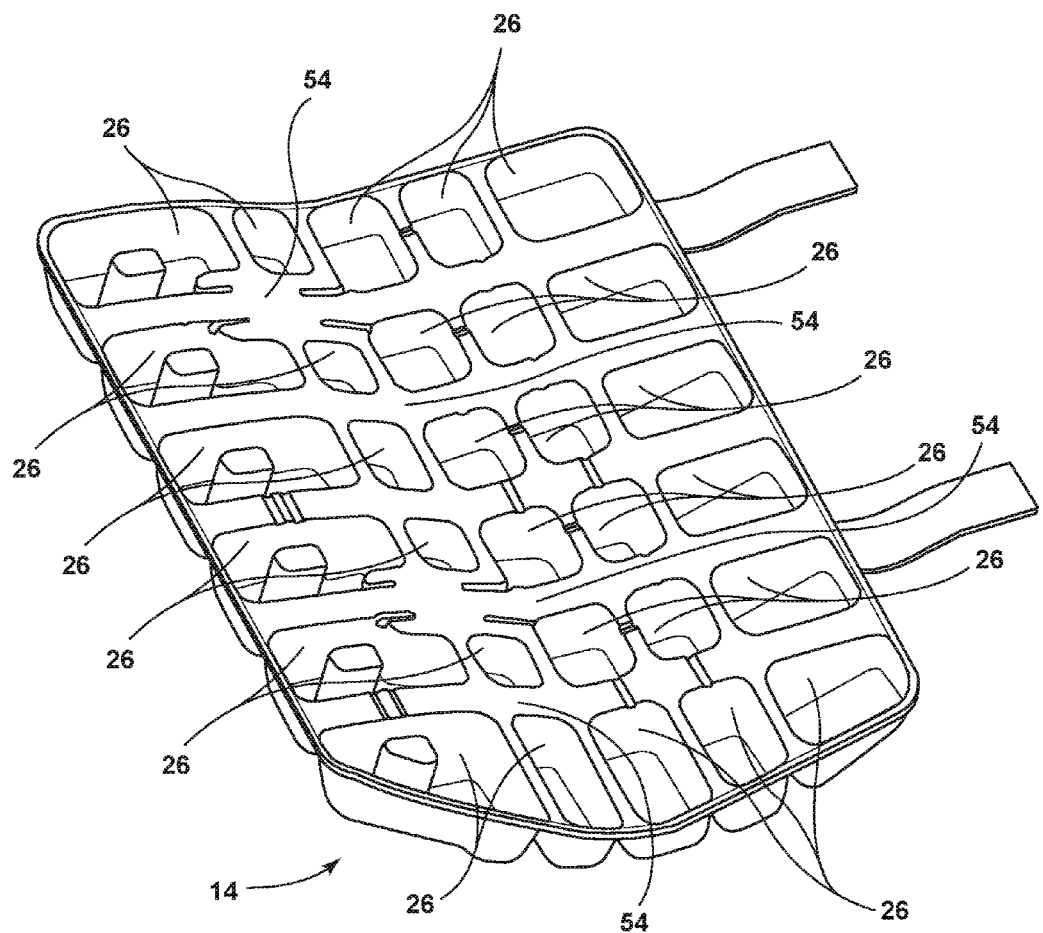
FIG. 8 is a perspective view of a formed lower sheet useable in a bladder unit according to an aspect of the disclosure.
Figure 9:
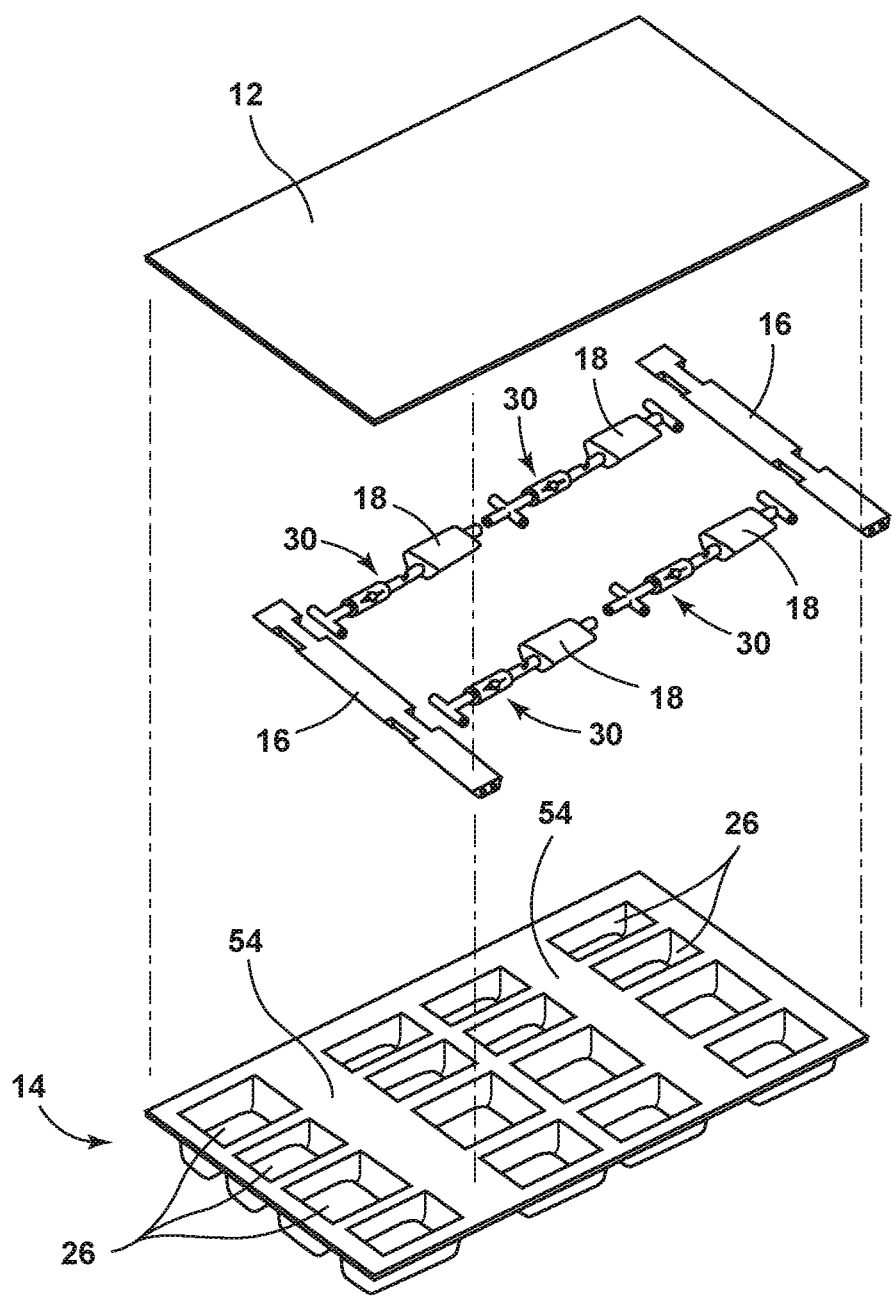
FIG. 9 is an assembly view of a plurality of extruded elements having capillaries therein and a corresponding plurality of coupling assemblies between the lower sheet of FIG. 8 and an upper sheet during.

In one example, shown in FIGS. 8 and 9, bladder unit 10 can be fabricated by first forming lower sheet 14 into the desired configuration of individual bladders 26 and surrounding lands 54 corresponding with the desired boundaries 24 between bladders 26. An example of such a lower sheet 14 is shown in FIG. 8, and may be fabricated by use of a vacuum-forming process including a hot-plate vacuum-forming process in which a generally flat sheet is formed into an arrangement similar to the depicted arrangement using heat and vacuum pressure. After formation of lower sheet 14 the desired arrangement of extruded elements 16 and 18, and associated coupling assemblies 36 can be laid in place over lower sheet 14. In various examples, the desired network of extruded elements 16 and 18 and coupling assemblies 36 can be pre-assembled prior to being positioned in the desired location over lower sheet 14. Alternatively, the individual extruded elements 16, 18 can be arranged in the desired locations along lower sheet 14 prior to joining thereof with the desired coupling assemblies 36. The particular desired assembly process may vary according with the various bonding techniques and/or materials, as described further below.

In one example, a hot-plate bonding process can be used to couple upper sheet 12 with lower sheet 14, including the respective capture of and bonding of extruded elements 16, 18, simultaneously with upper sheet 12 and lower sheet 14, as described above. In such an arrangement, the pre-formed lower sheet 14 and arranged network of extruded elements 16, 18 and coupling assemblies 36 can be aligned with a flat or similarly pre-formed upper sheet 12 with upper sheet 12, subsequently, being moved into contact with lower sheet 14 and the in-place extruded elements 16 and 18 under pressure and heat. In this manner, slight melting of upper sheet 12, lower sheet 14 and extruded elements 16, 18 can take place in a controlled manner such that the pressure among the elements causes bonding therebetween when the resulting assembly cools Such an assembly process is facilitated by fabricating upper sheet 12, lower sheet 14 and extruded elements 16, 18 of the same or similar materials, including, for example the various melting points thereof, as well as the viscosity thereof within the desired ranges of heating temperatures. Examples of such materials include low density polyethylene ("LDPE"), vinyl, and the like. In an alternative arrangement, various types of adhesive can be used to achieve the desired bonding among upper sheet 12, lower sheet 14, and extruded elements 16, 18. In an example, such adhesive can be applied over lands 54 of lower sheet 14 prior to positioning of extruded elements 16 and 18, with additional adhesive applied over upper faces 20 of extruded elements 16 and 18 prior to positioning of upper sheet 12. In one example, an adhesive can be a UV-activated adhesive that can allow for positioning and any needed repositioning of elements prior to activation of the adhesive and the resulting bonding among elements. To facilitate use of such a UV-activated adhesive, upper sheet 12, lower sheet 14, and extruded elements 16, 18 can be fabricated of a transparent material.

Figure 10:
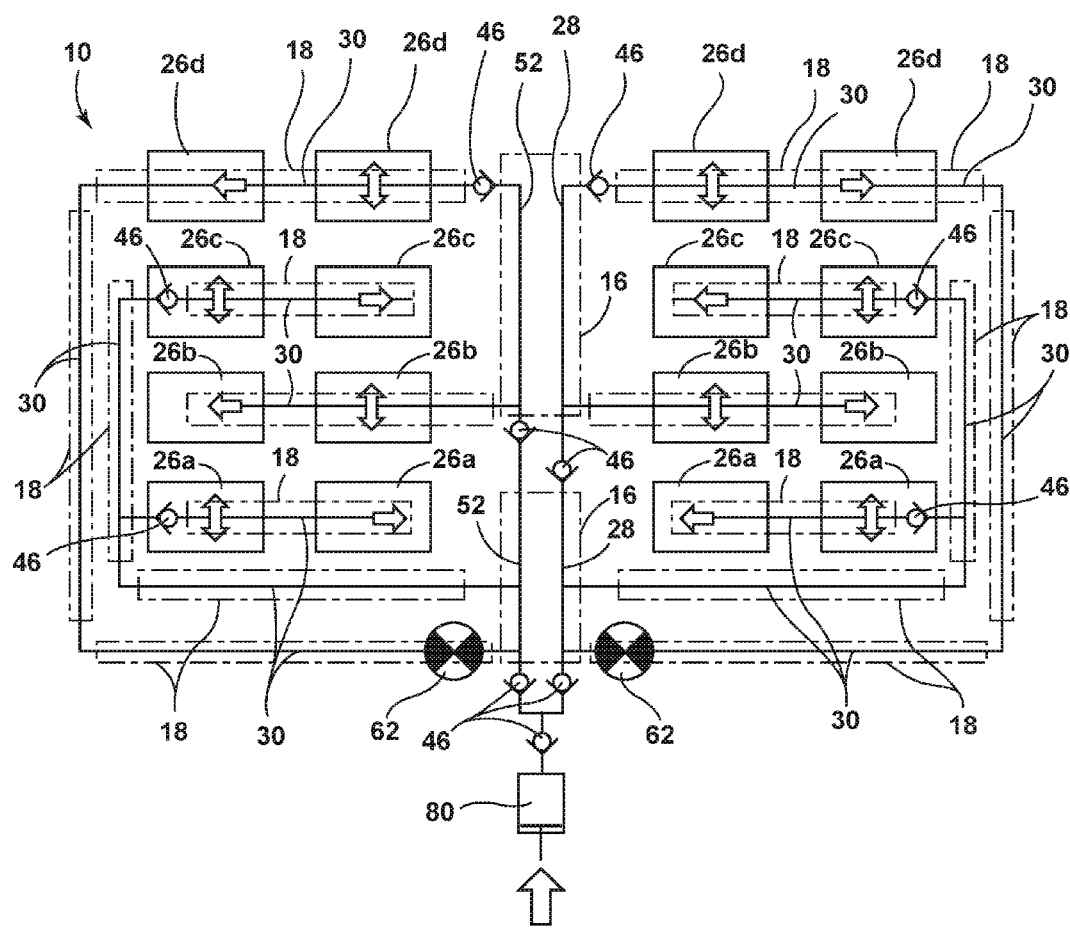
FIG. 10 is a schematic diagram of an example air flow network that can be achieved using extruded elements and coupling assemblies in a bladder unit.
Figure 11:
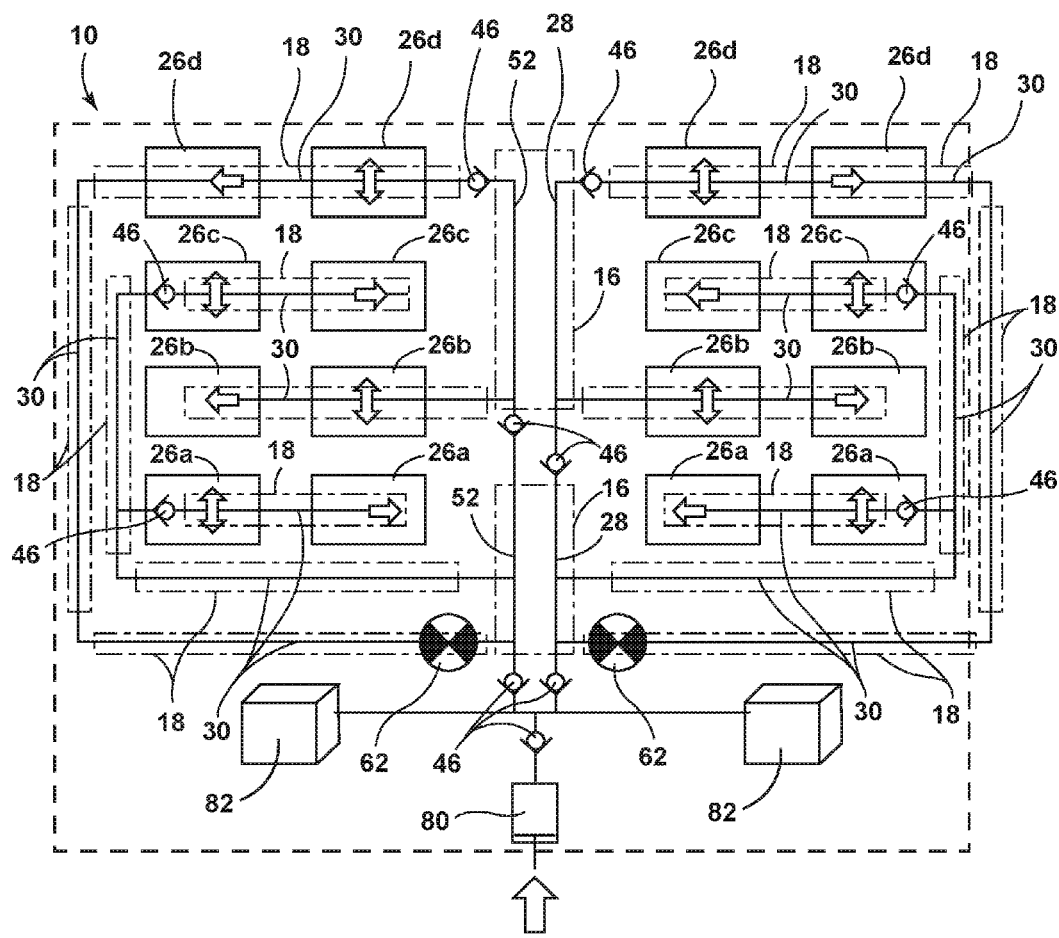
FIG. 11 is a further schematic diagram of an alternative example air flow network that can also be achieved using extruded elements and coupling assemblies in a bladder unit.
Figure 12:
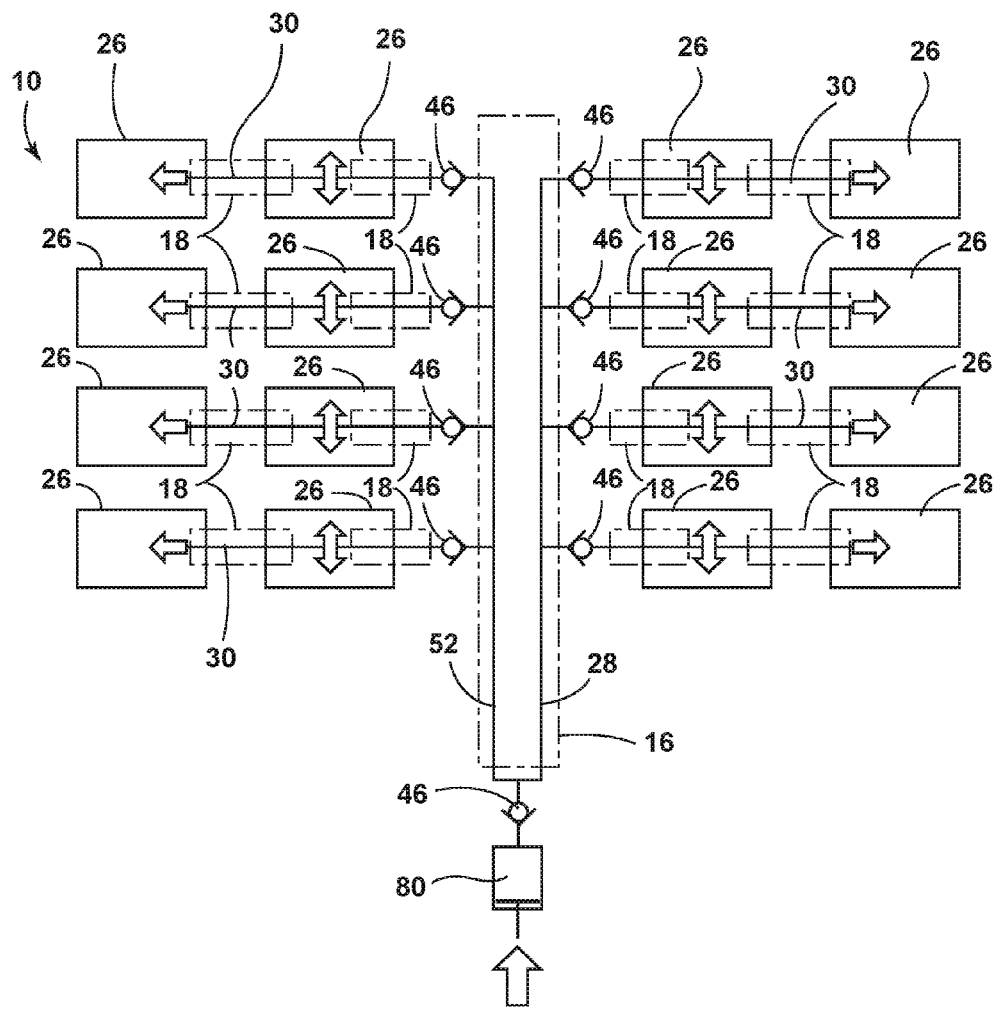
FIG. 12 is a further schematic diagram of an alternative example air flow network that can also be achieved using extruded elements and coupling assemblies in a bladder unit.
Figure 13:
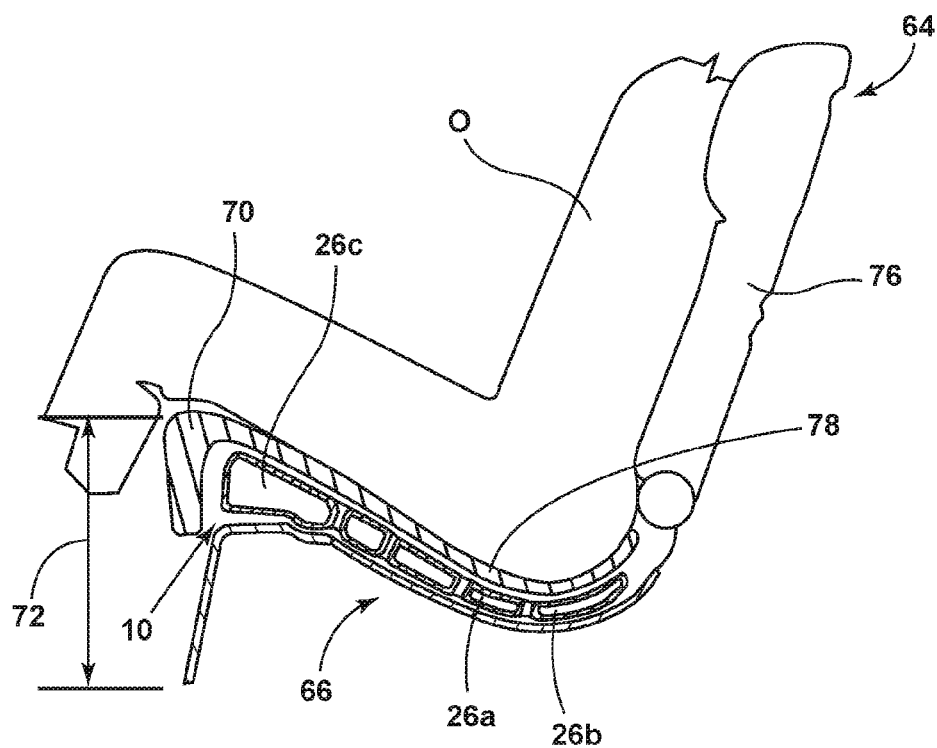
FIG. 13 is a side cross-section view of a vehicle seat that can include a bladder unit according to the various aspects of the present disclosure.
Figure 14:
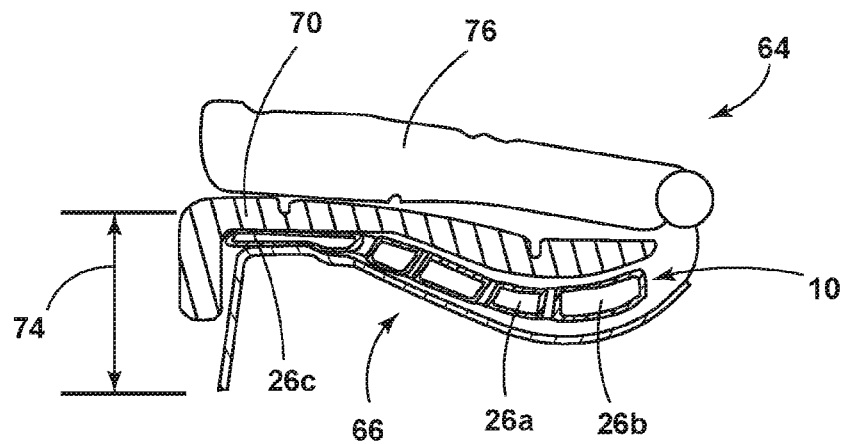
FIG. 14 is a further side cross-section view of the vehicle seat of FIG. 13 in a folded configuration.

FIGS. 10-12 schematically depict various arrangements of bladders 26 and the various capillaries 28, 30, 52, along with associated check valves 46 and 62 that can be achieved using the above-described extruded elements 16 and 18 and placed between associated upper sheets 12 and lower sheets 14. In one example, these various arrangements for bladder unit 10 can be used in a vehicle seat 64, as depicted in FIGS. 13 and 14. In particular, the various bladder units 10 can be constructed, as described further below, to allow for the transfer of air within various regions of the cushion 66 associated with seat 64. In this manner, bladder unit 10 is positioned within an interior of cushion 68 to allow an edge region 70 of cushion 66 to move between an expanded height 72 and a compressed height 74 under alternating pressure from an occupant O and seatback 76. As shown in FIG. 13, the weight of an occupant O on central region 78 of cushion 66 can cause transfer of air from, for example, bladders 26*a* and 26*b* to bladder 26*c* to move edge 70 to the expanded height 72 to support the occupant's legs. As shown in FIG. 14, when seat 64 is unoccupied and seatback 76 is moved into the illustrated folded arrangement, the pressure of seatback 76 on edge region 70 can cause transfer of air from bladder 26*c* to, for example, bladders 26*a* and 26*b*, thereby moving edge 70 to the compressed height 74 and allowing seatback 76 to fold to a generally more flat arrangement than would otherwise be allowed. Such an arrangement is further described in co-pending, commonly-assigned U.S. patent application Pub. Ser. Nos. 14/825,434, 14/623,957, and 14/623,970, the entire disclosures of which are incorporated by reference herein.

As shown in FIG. 10, bladder unit 10 may include a series of bladders 26 and associated capillaries 28, 30, 52 arranged in respective extruded elements 16, 18 as described above that can be pressurized using the depicted valve 80, which may, for example, be a Schraeder-type valve. In this manner, bladder unit 10 can be pre-pressurized to a desired level to facilitate the above-described transfer of air among bladders 26. In this arrangement valves 62 can be provided to allow or restrict movement of air between bladders 26*d* and bladders 26*a*, 26*b*, and 26*c*. In the depicted arrangement, two such valves 62 can be included to allow for separate inflation and deflation on different sides of extruded element 16, such as on opposite sides of a rear bench seat in a vehicle. Check valves 46 can be arranged to prevent backflow of air from bladders 26*d* into bladders 26*a*, 26*b*, and 26*c* except through valves 62 when open. In an example, the opening and closing of valves 62 can be linked with the position of seatback 76 such that when seatback 76 is in an upright position, valves 62 are closed, and when seatback 76 is moved toward the folded position, valves 62 are opened, thereby allowing the above-described transfer of air among bladders 26.

A similar arrangement is depicted in FIG. 11, in which one or more air pumps 82 are further coupled with bladder unit 10 to allow for additional, active, filling of bladders 26 if needed, such as due to de-pressurization of bladder unit 10 over time. As shown in FIG. 12, a simplified arrangement can be provided to allow for use of bladder unit 10 in a fixed state within a seat cushion 66 that is not intended to provide the above-mentioned redistribution of air under varying pressure.

Figure 15:
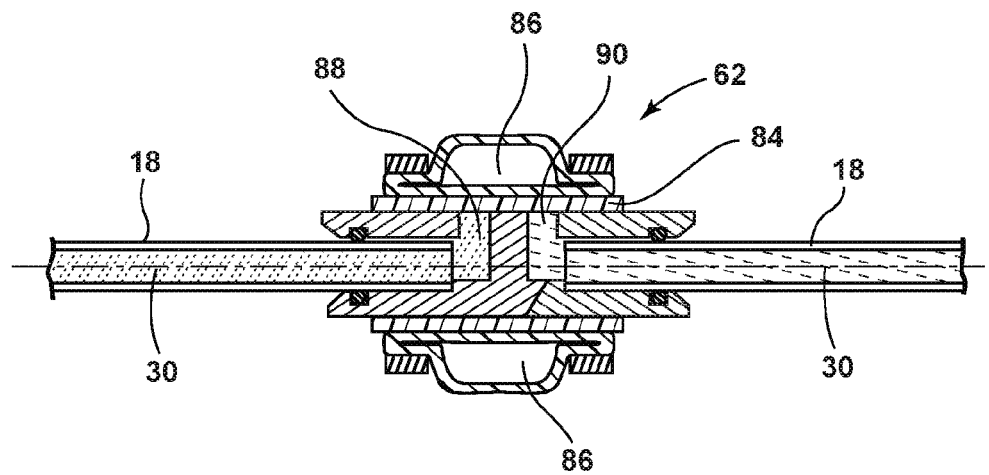
FIG. 15 is a side cross-section view of a valve that can be used in the bladder unit of FIG. 1.
Figure 16:
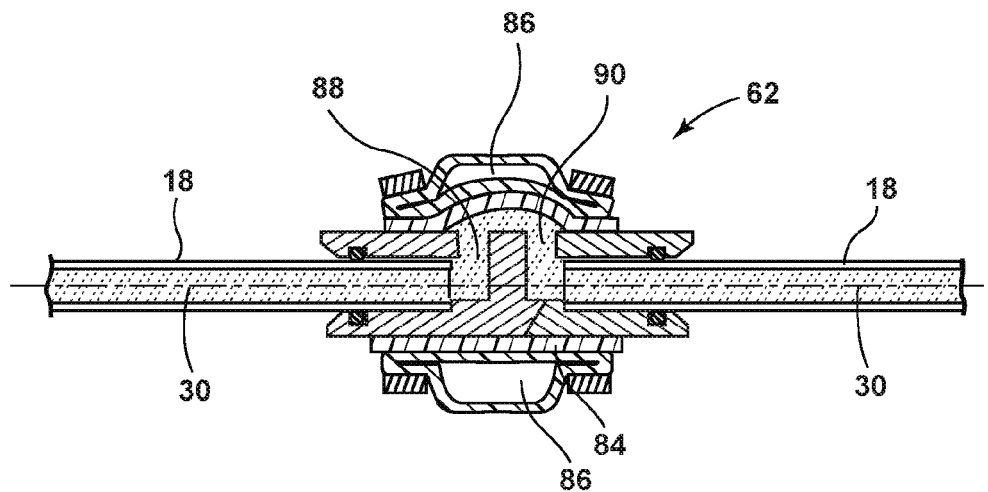
FIG. 16 is a side cross-section view of the valve of FIG. 15 in an open condition.

Turning to FIGS. 15 and 16, a particular arrangement that can be used for valves 62 in FIGS. 10 and 11, as described above is illustrated in which a normally open cuff valve 62 can be positioned in line along, for example, desired sections of extruded element 18. In such an arrangement, a pressure chamber 86 can surround both an upstream outlet 88 and a downstream inlet 90. In this arrangement, pressure chamber 86 can seal off outlet 88 an inlet 90 from each other to prevent movement of air from outlet 88 to inlet 90 when pressure chamber 86 is pressurized to a level above that of upstream outlet 88. Similarly, when pressure chamber 86 is at a relatively lower pressure, pressure from outlet 88 can cause outward deflection of pressure chamber to allow air to move into inlet 90. In an example, the pressure within pressure chamber 86 can be provided by an external arrangement including a ball, baffle, or the like that is mechanically coupled or otherwise arranged with respect to seatback 76 to control the pressurization thereof with movement of seatback 76 as described above. Although the depiction of FIGS. 15 and 16 show extruded element 18 being received within valve 62, alternative arrangements are possible in which valve 62 includes respective inlets and outlets that can be positioned within capillary 30.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:
1. A bladder unit, comprising:
upper and lower sheets defining opposed portions of a first bladder having an interior;

a tube extending through the interior of the first bladder and defining an outlet in communication between the tube and the interior; and a first extruded element having:
upper and lower faces respectively coupled with the upper sheet and the lower sheet at a portion of a first boundary of the first bladder; and
a first capillary extending through the first extruded element and across the portion of the first boundary, the tube being in fluid communication with the capillary.

2. The bladder unit of claim 1, wherein:
the first extruded element defines a length; and
the length of the first extruded element is normal to the first boundary.

3. The bladder unit of claim 1, further including a second extruded element having:
upper and lower faces respectively coupled with the upper sheet and the lower sheet along a portion of a second boundary of the first bladder;
a second capillary extending through the element and across the portion of the second boundary;
wherein:
the second boundary is normal to the first boundary; and
the first and second capillaries are fluidically coupled together.

4. The bladder unit of claim 3, wherein:
the second extruded element defines a length; and
the length of the second extruded element is normal to the second boundary.

5. The bladder unit of claim 4, wherein:
the length of the first extruded element is further aligned with a third boundary of the first bladder; and
the third boundary is normal to the first boundary.

6. The bladder unit of claim 3, wherein the first extruded element defines a notch along a portion of a length of the first extruded element and open between two exposed ends of the first capillary, the bladder unit further including:
a T-coupling extending between the two exposed ends of the first capillary and further coupling with the second capillary.

7. The bladder unit of claim 6, further including:
a tube coupling the T-coupling to the second capillary, the tube defining an opening disposed within the first bladder; and
a check valve disposed between the T-coupling and the opening.

8. The bladder unit of claim 1, wherein the first extruded element further includes a second capillary extending generally parallel with the first capillary.

9. The bladder unit of claim 1, wherein the first extruded element is spaced along the first boundary between opposing second and third boundaries of the first bladder.

10. The bladder unit of claim 1, wherein:
the upper and lower sheets further define opposed portions of a second bladder that shares a portion of the first boundary with the first bladder; and
the first extruded element is in fluidic communication with the first bladder and the second bladder.

11. The bladder unit of claim 1, wherein the first extruded element defines a length and is generally trapezoidal in a cross section normal to the length.

12. The bladder unit of claim 1, further including a cuff valve coupled with the first extruded element and in communication with the first capillary, the cuff valve being disposed outside of the first bladder.

13. A method for assembling a bladder unit, comprising:
positioning a first extruded body over a length of a land defined by a first designated boundary of a bladder at least partially defined in a first sheet, the first extruded body defining a notch along a portion of a length of the first extruded body and open between two exposed ends of a first capillary of the first extruded body;
positioning a second sheet over the first sheet; and
coupling the first extruded body with the first sheet and the second sheet along the length of the land defined by the first designated boundary with the capillary of the first extruded body in fluid communication with the bladder T-coupling extending between the two exposed ends of the first capillary of the first extruded element and further coupling with a second capillary.

14. The method of claim 13, further including directly coupling the second sheet with the first sheet along at least one of a remaining portion of the first boundary or a second boundary of the bladder.

15. The method of claim 14, wherein the coupling is achieved using one of adhesives or hot plate bonding.

16. The method of claim 13, further including vacuum-forming a portion of the bladder into the first sheet to define the first designated boundary of the bladder in the first sheet.

17. The method of claim 13, further including:
positioning a second extruded body over at least a portion of a second boundary of the bladder; and
coupling the second extruded body with the first sheet and the second sheet along the second designated boundary simultaneously with the coupling of the first extruded body with the first sheet and the second sheet along the first designated boundary.

18. The method of claim 17, wherein:
the bladder is a first bladder, the first sheet further including a second bladder opposite the second boundary from the first bladder; and
a capillary of the second extruded body is in fluid communication with the second bladder.

19. The method of claim 13, wherein the first extruded element defines an opening along a portion of the first boundary, the method further comprising:
coupling a check valve with the opening and positioning the check valve within the bladder after the first extruded body is positioned over at least the portion of the first designated boundary.

* * * * *